United States Patent [19]

Meyer et al.

[11] Patent Number: 5,454,453
[45] Date of Patent: Oct. 3, 1995

[54] BREAK-AWAY BRACKET FOR ATTACHING CROSS MEMBER

[75] Inventors: James R. Meyer, Ann Arbor; Richard A. Jeryan, Birmingham; Richard C. Kowalske, Livonia; Jack Hillyard, Royal Oak, all of Mich.

[73] Assignee: Ford Motor Company, Dearborn, Mich.

[21] Appl. No.: 161,035

[22] Filed: Dec. 3, 1993

[51] Int. Cl.⁶ ..................................................... B60K 5/12
[52] U.S. Cl. .......................... 180/377; 188/373; 280/784; 280/795; 403/41
[58] Field of Search .................................. 280/784, 795; 180/311, 312, 377; 188/371, 373, 376; 403/2, 41

[56] References Cited

U.S. PATENT DOCUMENTS

| | | | |
|---|---|---|---|
| 1,435,480 | 11/1922 | Kerr | 180/377 |
| 1,557,452 | 10/1925 | Goode | 180/377 |
| 3,597,994 | 8/1971 | Shiomi et al. . | |
| 3,600,971 | 8/1971 | Scarvella . | |
| 4,006,917 | 2/1977 | Liehr et al. | 188/376 |
| 4,194,411 | 3/1980 | Manabe et al. . | |
| 4,263,980 | 4/1981 | Harlow, Jr. et al. | 180/312 |
| 4,838,576 | 6/1989 | Hamasaki et al. . | |

*Primary Examiner*—Eric D. Culbreth
*Attorney, Agent, or Firm*—Donald A. Wilkinson; Roger L. May

[57] ABSTRACT

A break-away bracket for connecting structural beams in a vehicle such as connecting a transmission cross-member to a frame rail. The break-away bracket connects to the cross-member by use of a connecting pin. During normal operation, the cross-member is fixed to the bracket, which, in turn, is welded to the frame rail and acts as a normal fixed bracket. During the imposition of excessive loads on the front of the vehicle, a slot connecting between a hole for the connecting pin and an edge of the bracket allows the pin and cross-member to pull away from a portion of the bracket. The bracket yields, allowing axial displacement between the cross-member and the frame rail while still keeping the connection between the two components intact.

13 Claims, 2 Drawing Sheets

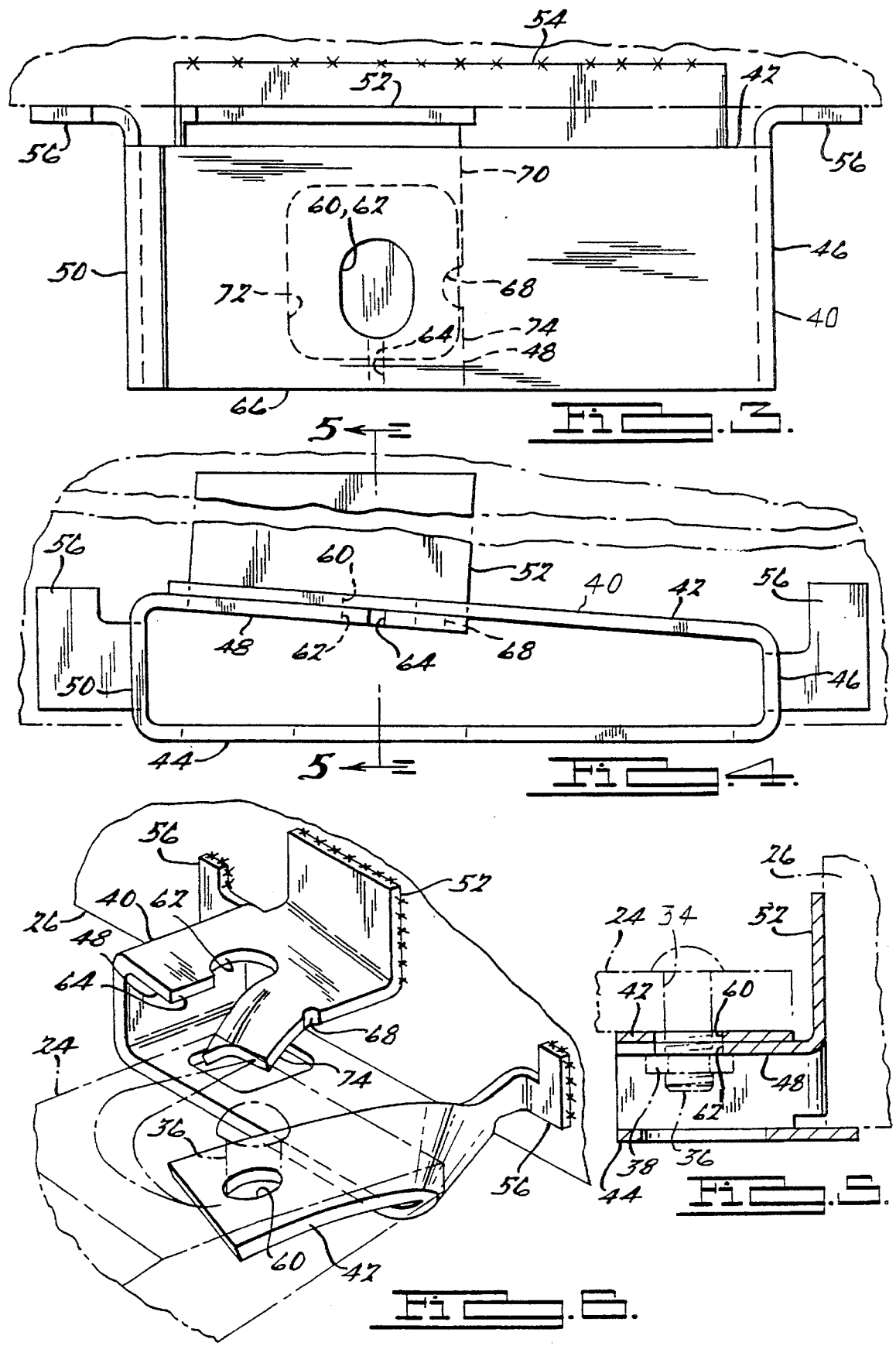

5,454,453

BREAK-AWAY BRACKET FOR ATTACHING CROSS MEMBER

FIELD OF THE INVENTION

The present invention relates generally to a means for interconnecting beams and more particularly to a means for interconnecting beams for use in automotive vehicles.

BACKGROUND OF THE INVENTION

During an imposition of excessive loads upon the front of a vehicle, it is desirable that the vehicle's transmission cross-member and frame rails remain connected to one another even if there is relative displacement between the two. Currently, on many vehicles, this desire is met through large deformations of a steel cross-member, which is rigidly affixed to the frame rails.

Also, however, during imposition of these excessive loads, it is desirable to minimize damage to the transmission cross-member in the locations where it attaches to the frame rails. If the transmission cross-member and frame rails are rigidly attached, then the chance of localized damage to these beams is increased.

Further, transmission cross-members can now be made out of a reinforced plastic material in order to reduce weight and reduce the transmission of noises and vibrations from the powertrain of a vehicle into the vehicle frame. In general, plastic cross-members cannot deform as much as steel cross-members, since the plastic material has a lower strain-to-failure limit. Thus, a different mechanism is needed to accommodate displacement caused by excessive loads while still keeping the transmission cross-member connected to the frame rails.

The need arises, therefore, for a mechanism that will allow for relative movement between two interconnecting beams during an excessive loading event while still allowing the two beams to remain attached; and furthermore will reduce the possibility for localized damage to the cross-member, whether made of metal or reinforced plastic.

SUMMARY OF THE INVENTION

In its embodiments, the present invention contemplates a break-away bracket for supporting a first beam having a connecting pin secured thereto relative to a second beam in a frame structure of a vehicle. The break-away bracket has a first portion, including a first bore therethrough adapted to receive the connecting pin and a second portion, aligned substantially adjacent to and parallel with the first portion, that includes a second bore therethrough, adapted to receive the connecting pin, and a displacement apparatus for permitting movement of the connecting pin out of the second bore. A third portion connects the first portion to the second portion. The second and third portions are affixed to the second beam, whereby the first beam is securely fixed relative to the second beam by the bracket and the bracket will allow axial displacement of the first beam relative to the second beam upon imposition of an excessive force on the vehicle, while the bracket still remains attached to both the first and second beams.

The present invention further contemplates, in combination, a break-away bracket, a transmission cross-member beam, having an end connection with a connecting pin secured thereto, and a frame rail for use in a vehicle. The bracket includes an apparatus for affixing the bracket to the frame rail and a first portion provided with a first bore for receiving the connecting pin. The bracket further includes a break-away apparatus for securing in fixed relationship the cross-member beam and the frame rail and having the ability to allow axial movement between the transmission cross-member and frame rail upon differential deflection of the two.

Accordingly, an object of the present invention is to provide a bracket that will connect two beam members together and allow for limited axial movement between the two during a frontal collision of the vehicle while still retaining the connection between the two beams.

An advantage to the present invention is that the bracket deformation allows the connection between two beam members to remain intact during a frontal collision while reducing the risk of localized damage to the beam members, so as to reduce the cost of repairing the overall beam structure.

A further advantage to the present invention is that a structural beam made of reinforced plastic can be used instead of a metal beam for a transmission cross-member when connecting it to frame rails in a vehicle while still accomplishing the desire of maintaining the connection between the cross-member and frame rail during a frontal collision.

BRIEF DESCRIPTION OF THE DRAWINGS

Other objects and advantages will occur to those skilled in the automotive body arts upon reading the following description with reference to the accompanying drawings in which;

FIG. 3 is a top plan view of a bracket in accordance with the present invention;

FIG. 4 is a side elevation view of a bracket in accordance with the present invention;

FIG. 5 is a sectional view taken along line 5—5 in FIG. 4; and

FIG. 6 is a view similar to FIG. 2 with the assembly shown in a post-crash position.

DETAILED DESCRIPTION OF THE PREFERRED EMBODIMENTS

Figure 1:
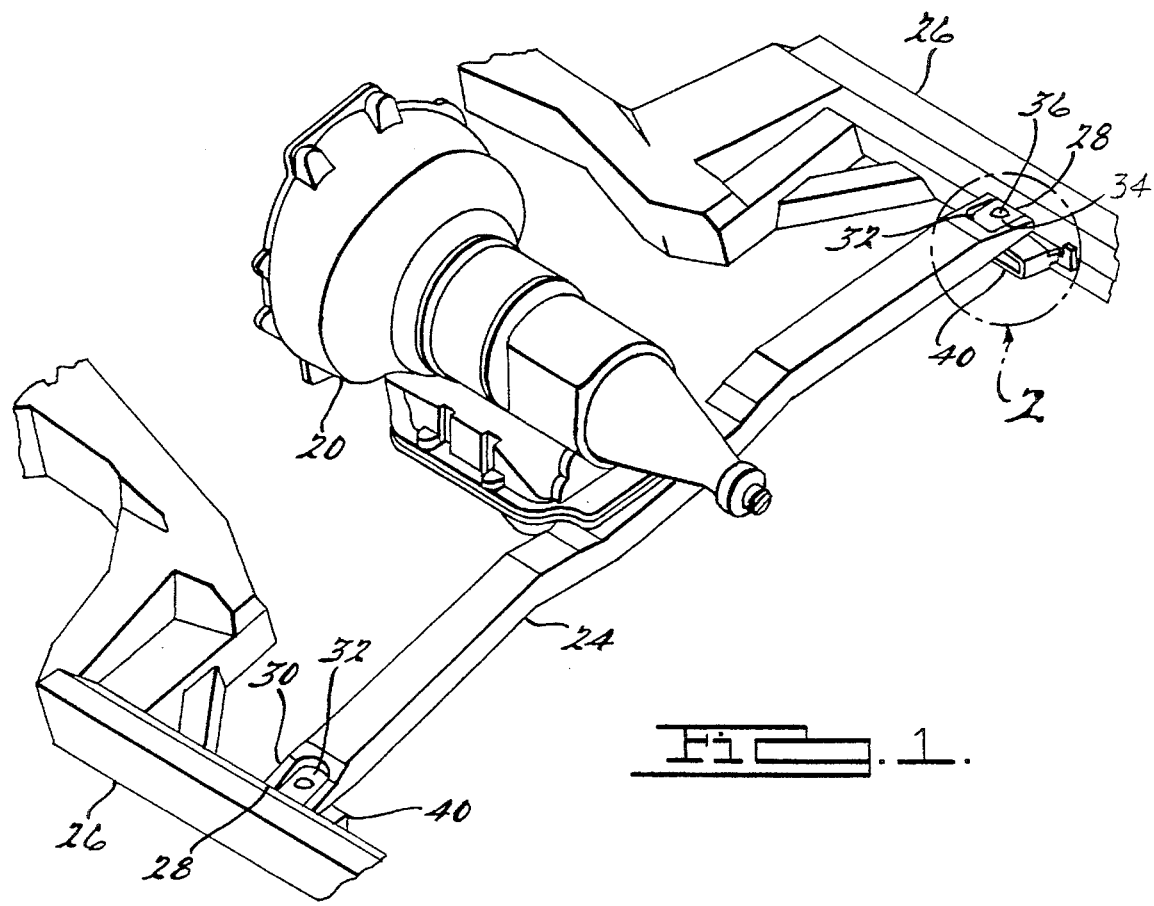
FIG. 1 is a partial perspective view of a transmission cross-member and bracket assembly within a vehicle structure in accordance with the present invention.
Figure 2:
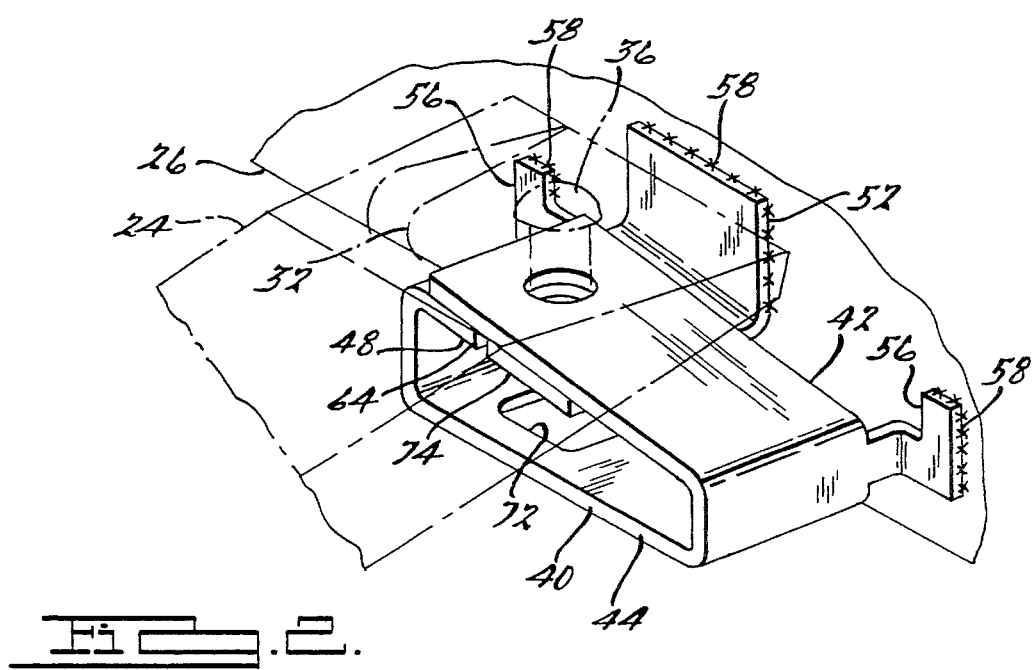
FIG. 2 is an enlarged view of the encircled area 2 in FIG. 1.

FIGS. 1 and 2 show a portion of a vehicle frame and drive train, including a transmission 20 supported by a transmission cross-member 24 in a conventional fashion that does not need further description. Located on either side of these components is a pair of frame rails 26. The transmission cross-member 24 acts as a first beam tying the frame rails 26 together. It is perpendicular to the frame rails 26 and preferably is made of a reinforced plastic material.

Each end 28 of the cross-member 24 has a tapered portion 30, including a semi-circular flat portion 32 nested in the tapered portion 30. A through-bore 34 is provided in the flat portion 32 for receiving a connecting pin 36, such as a bolt, and for securing the pin 36 to the cross-member 24. Each break-away bracket 40 is mounted to one of the two frame rails 26. The ends 28 of the cross-member 24 are, in turn, mounted on top of the brackets 40 via a pair of connecting pins 36.

The break-away bracket 40 can be seen in more detail in FIGS. 3–5. The bracket 40 is preferably made of steel, stamped and bent to the proper shape. The bracket 40 has a generally flat top portion 42 and a generally flat bottom portion 44. The two portions 42 and 44 are connected by a first side portion 46. A break-away portion 48 lies adjacent to and parallel with the top portion 42, and is roughly half of the length of the top portion 42. The break-away portion 48 and the bottom portion 44 are connected by a second side portion 50.

There are four weld flanges for securing the bracket 40 to the frame rails, as shown in FIGS. 2 and 3. An upper weld flange 52 is connected along one side of the break-away portion 48 and is oriented approximately normal thereto. A lower weld flange 54 is connected along one edge of the bottom portion 44, parallel thereto. Additionally, there are two side weld flanges 56, one each connected to the first side portion 46 and second side portion 50 respectively, oriented normal to the side portions 46 and 50. These four weld flanges are welded to the frame rail 26 around their edges, forming weld joints 58, as shown in FIGS. 2 and 3.

The top portion 42 and the break-away portion 48 each have a bore therethrough, aligned with one another, for receiving the connecting pin 36, shown in FIG. 1. The top portion 42 has connecting pin bore 60, and the break-away portion 48 has connecting pin bore 62. These bores 60 and 62 may be slightly elongated to allow for tolerances during installation. In addition, the breakaway portion 48 includes a slot 64 therethrough connecting the bore 62 to an edge 66. The width of the slot 64 is less than the diameter of the connecting pin 36 in order to retain it. The break-away portion 48 preferably includes a semi-circular notch 68 located along another edge 70 of the break-away portion 48, forming a tab 74 between the slot 64 and the notch 68.

Further, the bottom portion 44 includes an access hole 72. This hole 72 allows access, when needed, to install the connecting pin 36 during initial assembly of the cross-member 24 to the bracket 40, as shown in FIGS. 1 and 2. The connecting pin 36 is secured in place by threading a nut 38 onto the pin 36.

The break-away bracket 40 is designed to provide comparable stiffness rates to existing non-break-away brackets during normal vehicle operation in that the cross-member 24 is securely pinned to the bracket 40 and the bracket 40 is designed to not yield during normal vehicle operations. Thus, the bracket 40 will hold the cross-member 24 fixed relative to the frame rails 26 during normal vehicle operation.

On the other hand, if the vehicle experiences an imposition of excessive loads on the front of the vehicle, the bracket 40 is designed to yield, as illustrated in FIG. 6, allowing differential deflection of the two beams. During the initial phase of the imposition of the excessive loads, the frame rail 26 tends to buckle outwardly, causing the connecting pin 36 and top portion 42 of the bracket 40 to translate relative to the rest of the bracket 40. The slot 64 will allow the connecting pin 36 to pull out of the connecting pin hole 62 in the break-away portion 48 by bending the tab 74 about the notch 68.

The top portion 42 and the connecting pin 36, still attached to the cross-member 24 can now translate rearward, downward or upward. Since the bracket stiffness is now low, the deformation will take place in the bracket 40 rather than in the cross-member 24, and only small forces will be exerted on the cross-member 24 by the bracket 40. With only a small force exerted on the cross-member 24 by the bracket 40, the risk of local frame damage to the cross-member 24 is substantially reduced. The connection between the cross-member 24 and frame rail 26, nevertheless, remains intact.

As an alternative embodiment, the cross-member 24 can be made of steel. While the weight savings will not be realized as in the case of a reinforced plastic member, the bracket 40 will still serve the function of substantially reducing the risk of local frame damage by yielding during imposition of excessive impact forces on the front of the vehicle, thereby potentially reducing repair costs. Further, this bracket 40 can also be used in other frame connection joints to reduce local damage to major and expensive structural beams, thus requiring only replacement of the deformed bracket.

While certain embodiments of the present invention have been described in detail, those familiar with the art to which this invention relates will recognize various alternative designs and embodiments for practicing the invention as defined by the following claims.

We claim:

1. In combination, a break-away bracket, a transmission cross-member beam having an end connection with a connecting pin secured thereto, and a frame rail for use in a vehicle, with the bracket comprising:

means for affixing the bracket to the frame rail;

a first portion provided with a first bore for receiving the connecting pin; and break-away means for securing in fixed relationship the cross-member beam and the frame rail, and for allowing movement between the transmission cross-member and frame rail upon differential deflection of the two while maintaining connection between the bracket, cross-member and frame rail, with the break-away means including a second portion aligned substantially adjacent to and parallel with the first portion and including a second bore therethrough, with the second bore being adapted to receive the connecting pin, and displacement means for permitting movement of the connecting pin out of the second bore; and a third portion connecting the first portion to the second portion.

2. A combination according to claim 1, wherein the means for affixing the bracket to the frame rail comprises a plurality of welding flanges affixed to the bracket and welded to the frame rail.

3. A combination according to claim 1, wherein the displacement means comprises a slot connecting the second bore to an edge of the second portion.

4. A combination according to claim 3, wherein the second portion includes a notch along an edge of the second portion to thereby reduce the amount of force needed to force the connecting pin out of the second bore.

5. In combination, a first structural beam and a break-away bracket, including a connecting pin, for connecting the first beam to a second beam in a vehicle, with the first beam having an end portion with a connecting pin secured thereto, and with the bracket comprising:

a first portion, including a first bore therethrough adapted to receive the connecting pin;

a second portion aligned substantially adjacent to and parallel with the first portion and including a second bore therethrough adapted to receive the connecting pin, and displacement means for permitting movement of the connecting pin out of the second bore; and a third portion connecting the first portion to the second portion, with the second and third portions being affixed to the second beam, whereby the first beam will be held fixed relative to the second beam and the bracket will allow displacement of the first beam relative to the second beam upon imposition of an excessive force on the vehicle, while the bracket remains connected to the first and second beams.

6. A combination according to claim 5, wherein the displacement means comprises a slot connecting the second bore to an edge of the second portion.

7. A combination according to claim 6, wherein the second portion includes a notch along an edge of the second portion to thereby reduce the amount of force needed to force the connecting pin out of the second bore.

8. A combination according to claim 5, wherein the first beam comprises a transmission cross-member and the second beam comprises a frame rail.

9. A combination according to claim 5, wherein the second and third portions include a plurality of welding flanges affixed thereto, the welding flanges welded to the second beam.

10. A break-away bracket for supporting a first beam having a connecting pin secured thereto relative to a second beam in a frame structure of a vehicle, the breakaway bracket comprising:

a first portion, including a first bore therethrough adapted to receive the connecting pin;

a second portion aligned substantially adjacent to and parallel with the first portion and including a second bore therethrough, adapted to receive the connecting pin, and displacement means for permitting movement of the connecting pin out of the second bore; and a third portion connecting the first portion to the second portion, the second and third portions adapted to be affixed to the second beam, whereby the first beam will be securely fixed relative to the second beam by the bracket and the bracket is adapted to allow displacement of the first beam relative to the second beam upon imposition of an excessive force on the vehicle while the bracket remains connected to the first and second beams.

11. A break-away bracket according to claim 10, wherein the displacement means comprises a slot connecting the second bore to an edge of the second portion.

12. A break-away bracket according to claim 11, wherein the second portion includes a notch along an edge of the second portion to thereby reduce the amount of force needed to force the connecting pin out of the second bore.

13. A break-away bracket according to claim 10, wherein the second and third portions include a plurality of welding flanges affixed thereto, the welding flanges adapted to be welded to the second beam.

* * * * *